United States Patent [19]

Morita et al.

[11] 4,338,424
[45] Jul. 6, 1982

[54] MULTI-STEP GAS-PHASE POLYMERIZATION OF OLEFINS

[75] Inventors: Yoshinori Morita, Iwakuni; Akifumi Kato, Ohtake; Ryoichi Yamamoto, Yamaguchi, all of Japan

[73] Assignee: Mitsui Petrochemical Industries Ltd., Tokyo, Japan

[21] Appl. No.: 266,594

[22] Filed: May 22, 1981

[30] Foreign Application Priority Data

May 27, 1980 [JP] Japan .................. 55-69558

[51] Int. Cl.$^3$ ........................ C08F 2/34; C08F 10/00
[52] U.S. Cl. ................................... 526/65; 526/125; 526/901; 526/905
[58] Field of Search ................... 526/65, 88, 901, 905

[56] References Cited

U.S. PATENT DOCUMENTS

| | | | |
|---|---|---|---|
| 3,392,213 | 7/1968 | Berger | 526/65 |
| 3,592,880 | 7/1971 | Diedrich et al. | 526/65 |
| 4,048,412 | 9/1977 | Caumartin et al. | 526/125 |
| 4,098,974 | 7/1978 | Klaassen | 526/65 |

Primary Examiner—Edward J. Smith
Attorney, Agent, or Firm—Sherman & Shalloway

[57] ABSTRACT

In a process for polymerizing olefins in the gaseous phase in a first gas-phase polymerization zone and a second gas-phase polymerization zone, which are provided independently from each other, in the presence of a catalyst composed of a transition metal catalyst component and an organometallic compound of a metal of Groups I to III of the periodic table and in the co-presence of hydrogen gas while feeding the catalyst-containing polymer formed in the first zone to the second zone; the improvement wherein (i) a dilution zone for diluting a feed flow from the first gas-phase polymerization zone which comprises a mixture of the polymer, the catalyst, the olefin gas and hydrogen gas by feeding a fresh supply of olefin gas thereto is provided in a feed passage for feeding said flow from the first gas-phase polymerization zone to the second gas-phase polymerization zone, (ii) a part of the gas phase in said feed flow diluted in the dilution zone is recycled to the first gas-phase polymerization zone, and remainder is fed into the second gas-phase polymerization zone, and (iii) in the second gas-phase polymerization zone, the hydrogen to olefin mole ratio is maintained lower than that in the first gas-phase polymerization zone.

8 Claims, 1 Drawing Figure

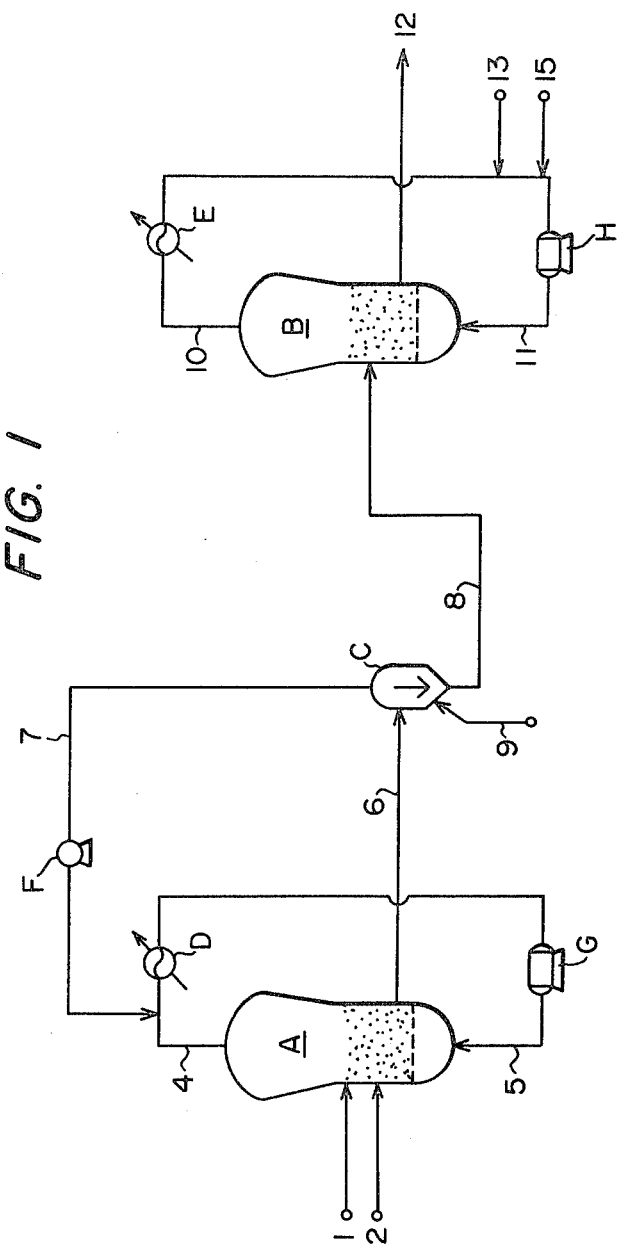
FIG. I

MULTI-STEP GAS-PHASE POLYMERIZATION OF OLEFINS

This invention relates to an improvement in a process for multi-step gas-phase polymerization of olefins, in which olefins are polymerized in the gaseous phase in at least two independent gas-phase polymerization zones advantageously both in regard to operation and apparatus while feeding a catalyst-containing polymer formed in a first polymerization zone to a second polymerization zone. In particular, it relates to an improved multi-step gas-phase polymerization process which is suitable for easily adjusting the molecular weight distribution and/or chemical composition distribution of the final olefin polymer composition to desired values by producing olefin polymers having different molecular weights and/or chemical compositions in two gas-phase polymerization zones.

In the present application, the term "polymerization" denotes not only homo-polymerization but also co-polymerization, and the term "polymer" denotes not only a homopolymer but also a copolymer.

Improvements of transition metal catalyst components for olefin polymerization have made it possible to produce olefin polymers in an amount of at least about 5000 g per millimole of transition metal, and at the present level of technology, the operation of removing catalyst after polymerization can be omitted. When such a highly active catalyst is used, a gas-phase process for polymerizing olefins is attracting attention because the operation after polymerization is very simple.

Olefin polymers are molded into articles by various methods, and the molded articles are used in many fields. It is important therefore to provide olefin polymers having various desired molecular weight distributions and/or chemical composition distributions depending upon the method of molding and the intended use of the molded article. The molecular weight distribution, etc. can be adjusted by varying the type, composition and amount of the polymerization catalyst or the polymerization conditions. In a process in which polymerization is carried out only in one polymerization zone, there is a limit in an area in which the molecular weight distribution, etc. can be adjusted. In order to eliminate such a limitation, there is known a process which comprises polymerizing olefins in the gaseous phase in the presence of a catalyst composed of a transition metal component and an organometallic compound of a metal of Groups I to III of the periodic table in the copresence of a hydrogen gas in a first gas-phase polymerization zone and a second gas-phase polymerization zone, which are provided independently from each other, while feeding a catalyst-containing polymer formed in the first zone to the second zone, wherein polymers having different molecular weights are formed in the individual zones so as to adjust the molecular weight distribution, etc. of the resulting polymer composition (Japanese Laid-Open Patent Publication No. 145589/1976 corresponding to U.S. Pat. No. 4,048,412).

In actual practice, however, such a multi-step gas-phase polymerization method suffers from a trouble which makes it difficult to adjust the molecular weight distribution and/or chemical composition distribution of the resulting olefin polymer composition to the desired values. For example, to obtain the desired molecular weight, it is usual to perform the polymerization in the presence of a molecular weight controlling agent such as hydrogen gas introduced into the polymerization zone. It has been found however that when the multi-step gas-phase polymerization process is carried out while adjusting the molecular weight by such a molecular weight controlling agent. It gives rise to a new technical problem to be solved which does not exist in solution polymerization or suspension polymerization.

For example, a polymerization process comprising forming a polymer of a relatively low molecular weight in a first zone and a polymer of a relatively high molecular weight in a second zone, which is industrially advantageous in operating the individual steps at nearly the same polymerization pressure and obtaining olefin polymers having different molecular weights in the individual steps, suffers from troubles associated with the operation and apparatus of gas-phase polymerization.

One of such troubles is as follows: The polymer-containing product flow from the first polymerization zone in which a polymer having a relatively low molecular weight is produced contains hydrogen in an amount considerably larger than that of hydrogen required as a molecular weight controlling agent in the second gas-phase polymerization in which a polymer of a relatively high molecular weight is to be produced. Accordingly, when the polymer-containing product flow from the first polymerization zone is directly fed to the second polymerization zone so as to produce a polymer of a higher molecular weight therein, it is necessary to reduce the ratio of hydrogen to olefin, and accordingly, it is necessary to supply additionally an exceedingly large amount of olefin to the second polymerization zone. Consequently, it is necessary to increase the scale of the second gas-phase polymerization zone to the one which is disadvantageous to operation and apparatus, or the polymerization pressure of the second gas-phase polymerization zone must be made considerably high than that in the first polymerization zone. This increases the cost and is disadvantageous to operation and apparatus. Particularly, in the latter case, it is technically difficult to feed the catalyst-containing product flow formed in the first zone to the second zone maintained at a higher pressure.

The present inventors made extensive investigations in order to achieve an improvement in a multi-step gas-phase polymerization process, which gives a solution to the aforesaid technical problems and permits advantageous performance of multi-step gas-phase polymerization of olefins both in operation and apparatus over conventional gas-phase polymerization processes.

These investigations have led to the discovery that the aforesaid technical problems can be solved, and a further improved process for multi-step gas-phase polymerization of olefins can be provided, by carrying out the multi-step gas-phase polymerization of olefins under the following three conditions (i), (ii) and (iii):

(i) a dilution zone for diluting a feed flow from the first gas-phase polymerization zone which comprises a mixture of the polymer, catalyst, the olefin gas and hydrogen by feeding a fresh supply of olefin gas thereto is provided in a feed passage for feeding said flow from the first gas-phase polymerization zone to the second gas-phase polymerization zone, (ii) a part of the gas phase in said feed flow diluted in the dilution zone is recycled to the first gas-phase polymerization zone, and the remainder is fed into the second gas-phase polymerization zone, and (iii) in the second gas-phase polymerization zone, the hydrogen to olefin mole ratio is maintained lower than that in the first gas-phase polymerization zone.

Furthermore, it has been found that by operating as above, the solid-gas ratio in the feed flow from the first gas-phase polymerization zone can be changed to the desired one by the diluting treatment performed in the dilution zone mentioned above.

It is an object of this invention to provide an improved process for the multistep gas-phase polymerization of olefins which can overcome the various disadvantages of the conventional multistep gas-phase polymerization of olefins.

The above and other objects and advantages of this invention will become more apparent from the following description.

Needless to say, an optional step of polymerizing olefins may be provided before the gas-phase polymerization in the first step and/or after the gas-phase polymerization in the second step. If desired, such a dilution zone as mentioned above may be provided in each of such additional steps.

The process of this invention can be conveniently utilized in the polymerization of olefins using a transition metal catalyst, particularly a catalyst composed of a highly active transition metal component and an organometallic compound of a metal of Groups I to III of the periodic table. Preferably, the process of this invention is applied to the polymerization of olefins using a highly active catalyst capable of producing at least about 5,000 g, especially at least about 8,000 g, of an olefin polymer per millimole of transition metal.

The transition metal component used as a catalyst component in the process of this invention is a compound of a transition metal such as titanium, vanadium, chromium and zirconium which may be liquid or solid under conditions of use. This component needs not to be a single compound, but may be supported on, or mixed with, another compound, or may be complex with another compound. Suitable is a highly active transition metal component capable of producing at least about 5,000 g, especially at least about 8,000 g, of an olefin polymer per millimole of transition metal. A typical example is a highly active titanium catalyst component activated with a magnesium compound.

Preferred are highly active transition metal catalyst components consisting essentially of titanium, magnesium and halogen. An example is a solid titanium catalyst component consisting of titanium, magnesium and halogen as essential ingredients and containing amorphous magnesium halide and having a specific surface area of preferably at least about 40 m$^2$/g, especially preferably from about 80 to about 800 m$^2$/g. Such components may contain an electron donor such as an organic acid ester, a silicate ester, an acid halide, an acid anhydride, a ketone, an acid amide, a tertiary amine, an inorganic acid ester, a phosphoric ester, a phosphorous ester or an ether. Advantageously, such components contain about 0.5 to about 15% by weight, preferably about 1 to about 8% by weight, of titanium, and have a titanium/magnesium atomic ratio of from about $\frac{1}{2}$ to about 1/100, especially from about $\frac{1}{3}$ to about 1/50, a halogen/titanium atomic ratio of from about 4 to about 100, preferably from about 6 to from about 80, and an electron donor/titanium mole ratio of from 0 to about 10, preferably from 0 to about 6. A number of such catalyst components have been suggested and widely known.

The organometallic compound, the other component constituting the catalyst, is an organometallic compound containing a metal of Groups I to III of the periodic table bonded to a carbon, for example organic alkali metal compounds, organic alkaline earth metal compounds, and organoaluminum compounds. Specific examples include alkyllithiums, arylsodiums, alkylmagnesiums, arylmagnesiums, alkylmagnesium halides, arylmagnesium halides, alkylmagnesium hydrides, trialkylaluminums, dialkylaluminum monohalides, alkylaluminum sesquihalides, alkylaluminum dihalides, alkylaluminum hydrides, alkylaluminum alkoxides, alkyllithium aluminums, and mixtures thereof.

In addition to the above two catalyst components, there may also be used an electron donor component such as an organic acid ester, a silicate ester, a carboxylic acid halide, a carboxylic acid amide, a tertiary amine, an acid anhydride, an ether, a ketone, an aldehyde or a halogenated hydrocarbon in order to adjust the stereoregularity, molecular weight, molecular weight distribution, etc. of the polymer. The electron donor catalyst component may be used after forming a complex compound (or an adduct) with the organometallic compound, or with another compound, for example a Lewis acid such as aluminum trihalides.

The process of this invention is applicable to the polymerization of polymerizable olefins having 2 to 12 carbon atoms. Specific examples include ethylene, propylene, 1-butene, 1-pentene, 1-hexene, 1-octene, 1-decene, 4-methyl-1-pentene, 3-methyl-1-pentene, styrene, butadiene, isoprene, 1,4-hexadiene, dicyclopentadiene, and 5-ethylidene-2-norbornene. One or more of these monomers may be chosen and homopolymerized or copolymerized in the gaseous phase.

In performing the process of this invention, it is not necessary to produce a polymer of the same composition in the first and second zones. The process of the invention is preferably applied to the homopolymerization of ethylene or propylene, copolymerization of ethylene and another olefin, and copolymerization of propylene and another olefin. In an especially preferred embodiment, the process of the invention is applied to the homopolymerization or copolymerization of ethylene in which the adjustment of molecular weight distribution is desired.

Gaseous-phase polymerization in each of the polymerization zones may be carried out using a fluidized bed reactor, a stirred bed reactor, a stirred fluidized bed reactor, a tubular reactor, etc. The reaction temperature in each of the polymerization zone is below the melting point of the olefin polymer, preferably at least about 10° C. lower than the melting point, and from room temperature to about 130° C., preferably from about 40° to about 110° C. The polymerization pressure is, for example, from atmospheric pressure to about 150 kg/cm$^2$.G, preferably from about 2 to about 70 kg/cm$^2$.G. Hydrogen used in the polymerization is in amount of, for example, about 0.001 to about 20 moles, preferably about 0.02 to about 10 moles, per mole of the olefin. The reaction temperature and pressure may be different for the two polymerization zones. When the reaction pressure in the second polymerization zone is lower than that in the first zone, it is advantageous for feeding the polymer. But no special difficulty arises even when the pressure in the second zone is higher than that in the first zone.

In the process of this invention, the amount of the catalyst is preferably such that per liter of the volume of a polymerization fluidized bed of each gas-phase polymerization zone, the transition metal compound is used in an amount of about 0.0005 to about 1 millimoles, preferably about 0.001 to about 0.5 millimoles, calculated as transition metal atom and the organometallic compound is used in an atomic ratio of the metal of the organo-metallic compound to the transition metal of from about 1 to about 2,000, especially from about 1 to about 500. The electron donor component is preferably used in an amount of 0 to about 1 mole, particularly 0 to about 0.5 mole, per mole of the organometallic compound.

Since the olefin polymer discharged from the first gas-phase polymerization zone contains olefin gas and hydrogen gas, it is diluted in the dilution zone with a fresh supply of olefin gas before it is fed into the second gas-phase polymerization zone. The olefin gas to be used in dilution is preferably an olefin which is commonly used in the first and second gas-phase polymerization zones. Accordingly, the polymers produced in the first and second gas-phase polymerization zones in the present invention should desirably have the same or very similar composition as or to the olefins constituting these polymers. For example, the polymerization process is preferably comprised of the polymerization in the first zone, dilution in the dilution zone and the polymerization in the second zone in this order in the following combinations: (A) polymerization of ethylene . . . dilution with ethylene . . . polymerization of ethylene, (B) polymerization of ethylene . . . dilution with ethylene . . . copolymerization of ethylene with another olefin (production of a copolymer consisting of ethylene as a main component), or (C) copolymerization of ethylene with another olefin . . . dilution with ethylene or a mixture of ethylene with the other olefin . . . copolymerization of ethylene with the other olefin.

The degree of dilution with the olefin in the dilution zone can be varied depending upon the extents of polymerization in the first and second polymerization zones, the ratio of hydrogen used in the first and second zones, or the amount of gases in the feed flow from the first gas-phase polymerization zone. Preferably, the amount of the olefin gas freshly supplied to the diluting zone is about 1.5 to about 200 times, more preferably about 3 to about 50 times, the volume of the gas phase in the feed flow from the first gas-phase polymerization zone.

A part of the gas phase in the diluted feed flow, after removing the entrained olefinic polymer as much as possible through a cyclone, etc., is recycled to the first gas-phase polymerization zone by elevating the pressure, etc. The remainder is fed to the second gas-phase polymerization zone.

Since the remainder of the feed flow has a reduced proportion of hydrogen as a result of dilution with the fresh supply of olefin gas as compared with that in the first gas-phase polymerization zone, even when the second polymerization zone is maintained at the same or lower pressure as or than the first zone, the hydrogen to olefin mole ratio can be adjusted easily to a lower value than in the first polymerization zone. In particular, when the second gas-phase polymerization zone is operated at a lower pressure than the first gas-phase polymerization zone, the supply of the remainder of the feed flow mentioned above to the second gas-phase polymerization zone can be effected simply by the difference in pressure, thus obviating the technically difficult problem of elevating the pressure of the solid-gas mixture during the transportation.

In the first gas-phase polymerization zone in this invention, the hydrogen to olefin ratio is made higher than in the second gas-phase polymerization zone, and an olefin polymer having a low molecular weight is produced. To produce a low-molecular-weight polymer, the polymerization should be carried out in the presence of a large amount of hydrogen and under a low partial pressure of olefin. Although under these conditions the rate of polymerization becomes relatively low, since the highly active transition metal catalyst is characterized by having an especially high activity at the early stage of polymerization, the production in the first place of the low-molecular-weight polymer using such a highly active transition metal catalyst permits a decrease in the reaction volume and makes it easy to remove the heat of polymerization, thus leading to the easy and advantageous performance of the process of this invention.

In the process of this invention, the hydrogen to olefin mole ratio in the second gas-phase polymerization zone is maintained lower than that in the first gas-phase polymerization zone. Preferably, the hydrogen to olefin mole ratio in the second gas-phase polymerization zone is about to 0.001 about 0.7 times that in the first zone.

In the second gas-phase polymerization zone, an olefin can be polymerized in the gas phase using the same apparatus and method as described above with regard to the first gas-phase polymerization zone. Without the need to feed a fresh supply of the transition metal catalyst component, sufficient catalysic activity can be maintained only by the transition metal catalyst component contained in the olefin polymer. If desired, the transition metal component may be additionally fed. Preferably, the organometallic compound is added freshly at this stage because it frequently results in increased catalytic activity. The electron donor component may also be added freshly. Even when these additional amounts of the catalyst components are used, the total amount of the catalyst components and the ratio of these components should preferably be within the ranges already described hereinabove. The polymerization of the olefin in the second zone may be carried out using only the olefin fed to the second zone together with the remainder of the feed flow. Since the amount of such an olefin is usually small, it is preferred to supply the olefin freshly to the second step. The polymerization conditions may be the same as in the first zone except that the hydrogen to olefin mole ratio is lower than that in the first zone, and the polymerization pressure is preferably lower than in the first step.

The ratio of polymerization in the first zone and that in the second zone is optional. Preferably, in terms of the weight of the polymer formed, the ratio is from about 20:about 80 to about 80:about 20, preferably from about 35:about 65 to about 65:about 35.

According to this invention, an olefin polymer composition having a desired molecular weight distribution can be advantageously produced on an industrial scale.

The following Examples and Comparative Examples illustrate the present invention more specifically.

EXAMPLES 1 TO 5 AND COMPARATIVE EXAMPLES 1 AND 2

FIG. 1 of the accompanying drawing is a schematic flow diagram of two-step gas-phase polymerization of ethylene. In the drawing, A represents a first-step gas-phase polymerization vessel; B, a second-step gas-phase polymerization vessel; and C, a dilution mixing tank for adding a fresh supply of ethylene gas to the olefin polymer discharged from the first-step vessel A which contained gaseous olefin and hydrogen thereby to dilute it. In the present Examples, ethylene in an amount corresponding to the total amount of ethylene consumed in the polymerization in the first step was fed into the device C to dilute hydrogen in the gas discharged from the first-step polymerization vessel. The gas containing hydrogen diluted with ethylene was passed from the device C through line 7 and fed to a circulating gas line of the first-step gas-phase polymerization zone using a pressure-raising device F. A stirrer rotated at a low speed was provided within the device C so as to prevent agglomeration of polyethylene powder which may form by polymerization within the device C. The polyethylene powder discharged from the device C through line 8 and containing ethylene gas was fed into the second gas-phase polymerization vessel B and subsequently, the second-step gas-phase polymerization was carried out.

In the drawing, D and E represent heat exchangers used for cooling the gas circulated in the first and second gas-phase polymerization zones, and G and H represent blowers for circulating the gas.

Using the above apparatus, polyethylene having a very broad molecular weight distribution was produced in the following manner by forming polyethylene having a high MI in the first step polymerization vessel, and polyethylene having a low MI in the second-step polymerization vessel.

[Preparation of a catalyst]

In a stream of nitrogen, 476 g of anhydrous magnesium chloride, 1.5 liters of decane, 1.81 liters of 2-ethylhexyl alcohol and 84 ml of ethyl benzoate were charged into a catalyst synthesizing device, and reacted at 140° C. for 3 hours. The reaction mixture was then cooled to room temperature.

The resulting solution was charged into 20 liters of titanium tetrachloride kept at $-20°$ C., and the mixture was maintained at this temperature for 30 minutes. It was then heated to 80° C. over 3 hours, and 220 liters of ethyl benzoate was added. The reaction was then carried out at this temperature for 2 hours. The resulting solid portion was separated by filtration, again suspended in 20 liters of titanium tetrachloride and reacted at 90° C. for 2 hours. The solid was separated by filtration, then repeatedly washed, and suspended in butane. The catalyst had an average particle diameter of 18 microns, and a very narrow particle size distribution.

[Two-step gas-phase polymerization]

The catalyst suspended in a small amount of butane, and triethyl aluminum were continuously fed into the first-step gas-phase polymerization vessel A having a diameter of 40 cm and a volume of 400 liters as shown in FIG. 1 at a rate of 1 mmole/hr calculated as Ti atom and 40 mmoles/hr. In the meantime, ethylene was fed at a rate of 10.6 kg/hr (corresponding to the amount consumed in the polymerization in the first-step gas-phase polymerization vessel) through line 9, and fed into the first-step polymerization vessel through circulating gas lines 4 and 5 via line 7 and pressure-raising device F. Hydrogen was fed through line 2 so that the $H_2$/ethylene mole ratio in the reactor was maintained at 4.

In the first-step polymerization vessel, the polymerization pressure was 25 kg/cm$^2$.G, the polymerization temperature was 80° C., the residence time was 2 hours, and the linear velocity of the gas in the polymerization vessel was maintained at 25 cm/sec. in order to maintain a well fluidized state in the gas-phase polymerization vessel. Under these conditions, polyethylene powder having an MI of 370, a density of 0.975 g/cm$^3$ and a bulk density of 0.41 g/cm$^3$ was continuously discharged at a rate of 10.2 kg/hr. Simultaneously, the gas corresponding to 100 N1 of hydrogen and 401 N1 of ethylene was discharged from the first-step gas-phase polymerization vessel into the device C maintained at a pressure of 20 kg/cm$^2$.G and a temperature of about 50° C. In the device C, the ethylene gas containing hydrogen was diluted to about 10 times with the ethylene gas fed from line 9. A greater portion of hydrogen was returned to the first-step polymerization vessel through line 7. The gas containing hydrogen diluted with ethylene gas in the device C was fed into the second-step gas-phase polymerization vessel B with the polyethylene powder through line 8 by a difference in pressure. The amount of ethylene gas fed into the second gas-phase polymerization vessel together with 10.2 kg/hr of the polymethylene powder was 308 N1/hr, and the amount of hydrogen likewise fed into the second-step polymerization vessel was 9 N1/hr.

In the second-step polymerization vessel, the polymerization pressure was 15 kg/cm$^2$.G, the polymerization temperature was 80° C., the residence time was 1 hour, and the linear velocity of the circulting gas through lines 10 and 11 was maintained at 25 cm/sec. Ethylene was fed at a rate of 10.5 kg/hr into the second-stage polymerization vessel through line 13, and hydrogen was fed into the second polymerization vessel through line 15 so that the mole ratio of $H_2$/ethylene was maintained at 0.15.

From the second-step polymerization vessel, polyethylene having a very broad molecular weight distribution, an MI of 0.18, a density of 0.963 g/cm$^3$, a bulk density of 0.39 g/cm$^3$ and a $M_W/M_N$ of 22.9 was discharged at a rate of 20.5 kg/hr through line 12.

The above procedure was repeated under different gas-phase polymerization conditions. For comparison, the gas-phase polymerization was carried out continuously in a single step using the catalyst used in Example 1. The results are shown in Table 1.

TABLE 1

| | First-step gas-phase polymerization conditions | | | | | | Conditions in device C | | | | Second-step gas-phase polymerization conditions | | | | | Properties of the polymer | | | |
|---|---|---|---|---|---|---|---|---|---|---|---|---|---|---|---|---|---|---|---|
| | Temperature (°C) | Pressure (kg/cm². G) | Residence time (hr) | H₂ to ethylene mole ratio | Co-monomer to ethylene mole ratio | Type of the co-monomer | Temperature (°C) | Pressure (kg/cm². G) | Residence time (min.) | H₂ diluting ratio | Temperature (°C) | Pressure (kg/cm². G) | Residence time (hr) | H₂ to ethylene mole ratio | Co-monomer to ethylene mole ratio | Type of the co-monomer | Ratio of polymerization in the 1st step to the 2nd step (wt. %) | Bulk density (g/cm³) | MI (g/10 min.) | Density (g/cm³) | Molecular weight distribution (Mw/Mn) |
| Example 1 | 80 | 25 | 2 | 4.0 | 0 | — | 50 | 20 | 10 | 10 | 80 | 15 | 1 | 0.15 | 0 | — | 49.8/50.2 | 0.39 | 0.18 | 0.963 | 22.9 |
| Example 2 | 80 | 28 | 1.6 | 4.0 | 0 | — | 50 | 20 | 10 | 7 | 80 | 13 | 1 | 0.11 | 0 | — | 61.9/38.1 | 0.40 | 0.22 | 0.965 | 27.2 |
| Example 3 | 80 | 21 | 2 | 1.5 | 0.05 | propylene | 50 | 17 | 8 | 16 | 80 | 11 | 1 | 0.08 | 0.06 | propylene | 50.3/49.7 | 0.42 | 0.45 | 0.939 | 23.5 |
| Example 4 | 75 | 16 | 2.3 | 1.8 | 0.14 | butene-1 | 44 | 14 | 8 | 17 | 75 | 9 | 1 | 0.14 | 0.18 | butene-1 | 41.4/58.6 | 0.38 | 1.76 | 0.927 | 16.0 |
| Example 5 | 75 | 10 | 2.0 | 1.2 | 0.10 | 4-methyl-pentene-1 | 49 | 8 | 5 | 6 | 75 | 6.5 | 1 | 0.08 | 0.10 | 4-methyl-pentene-1 | 50.0/50.0 | 0.35 | 0.88 | 0.919 | 17.3 |
| Comparative Example 1 | 80 | 25 | 2 | 2.5 | 0 | — | — | — | — | — | — | — | — | — | — | — | 100/0 | 0.40 | 86 | 0.973 | 7.8 |
| Comparative Example 2 | 75 | 20 | 2 | 0.45 | 0.016 | butene-1 | — | — | — | — | — | — | — | — | — | — | 100/0 | 0.38 | 2.2 | 0.926 | 8.1 |

What we claim is:

1. In a process for polymerizing olefins in the gaseous phase in a first gas-phase polymerization zone and a second gas-phase polymerization zone, which are provided independently from each other, in the presence of a catalyst composed of a transition metal catalyst component and an organometallic compound of a metal of Groups I to III of the periodic table and in the co-presence of hydrogen gas while feeding the catalyst-containing polymer formed in the first zone to the second zone; the improvement wherein
   (i) a dilution zone for diluting a feed flow from the first gas-phase polymerization zone which comprises a mixture of the polymer, the catalyst, the olefin gas and hydrogen gas by feeding a fresh supply of olefin gas thereto is provided in a feed passage for feeding said flow from the first gas-phase polymerization zone to the second gas-phase polymerization zone,
   (ii) a part of the gas phase in said feed flow diluted in the dilution zone is recycled to the first gas-phase polymerization zone, and remainder is fed into the second gas-phase polymerization zone, and
   (iii) in the second gas-phase polymerization zone, the hydrogen to olefin mole ratio is maintained lower than that in the first gas-phase polymerization zone.

2. The process of claim 1 wherein the amount of the olefin gas freshly supplied to the dilution zone is such as to dilute the gas phase in the polymer feed flow from the first gas-phase polymerization zone to about 1.5 to about 200 times its volume.

3. The process of claim 1 wherein the amount of the hydrogen gas in the first gas-phase polymerization zone and the second gas-phase polymerization zone is about 0.001 to about 20 moles per mole of the olefin.

4. The process of claim 1 wherein the multi-step gas-phase polymerization is carried out at a temperature of from room temperature to about 130° C. and a pressure of from atmospheric pressure to about 150 kg/cm$^2$.G.

5. The process of claim 1 wherein the hydrogen to olefin mole ratio in the second gas-phase polymerization zone is about 0.001 to about 0.7 times that in the first gas-phase polymerization zone.

6. The process of claim 1 wherein the catalyst is composed of a highly active transition metal catalyst component capable of forming at least about 5,000 g, per millimole of transition metal, of an olefin polymer under the polymerization conditions in the first gas-phase polymerization zone, and an organoaluminum compound.

7. The process of claim 6 wherein the highly active transition metal catalyst component consists essentially of titanium, magnesium and halogen.

8. The process of claim 1 wherein per liter of the volume of the fluidized bed of each gas-phase polymerization zone, the amount of the transition metal catalyst component is about 0.0005 to about 1 millimole as transition metal atom, and the amount of the organometallic compound is such that the atomic ratio of the metal of the organometallic compound to the transition metal is from about 1 to about 2,000.

* * * * *